Dec. 26, 1967   H. J. WITKOWSKI   3,360,131
FILTER WITH POLYURETHANE FOAM ELEMENT
Filed June 15, 1964

INVENTOR.
HENRY J. WITKOWSKI
BY
Charles J. Lovercheck
attorney

United States Patent Office 3,360,131
Patented Dec. 26, 1967

3,360,131
FILTER WITH POLYURETHANE FOAM ELEMENT
Henry J. Witkowski, 3934 Davenport Ave., Erie, Pa. 16509
Filed June 15, 1964, Ser. No. 375,064
3 Claims. (Cl. 210—456)

This invention relates to filters and, more particularly, to the type of filter suitable for removing foreign materials from fluids such as liquids and gases.

Various filters of the general type disclosed herein have been used; however, all of these filters have various disadvantages in complexity of construction, inconvenience and expense in replacing cartridges therein.

The filter disclosed herein is made up of a hollow body that has a filter element or cartridge made up of a foam element bonded or molded to a resilient base member such as polyethylene or rubber which holds the filter element in place in the filter. Thus the usual expensive construction of the filter as well as time consuming necessary assembly operations are eliminated.

It is, accordingly, an object of the present invention to provide an improved filter.

Another object of this invention is to provide an improved filter cartridge.

A further object of the invention is to provide a filter which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
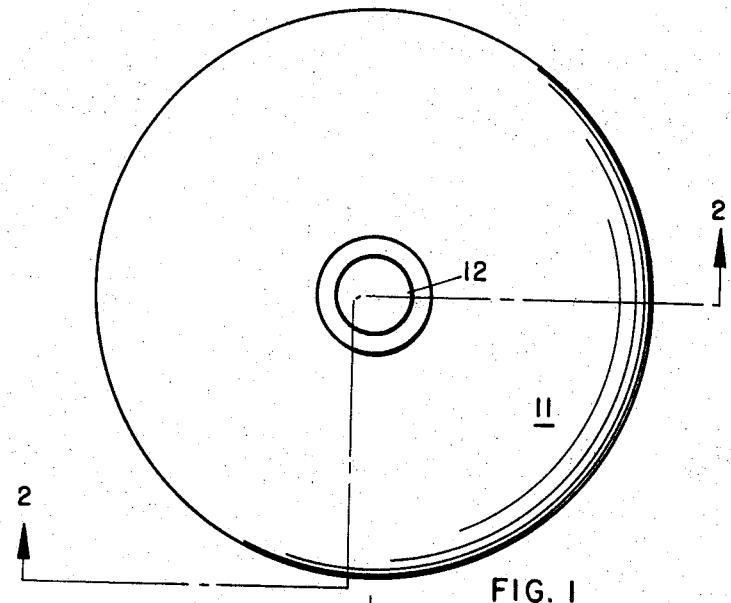
FIG. 1 is a top view of the filter shown in FIG. 2.
Figure 2:
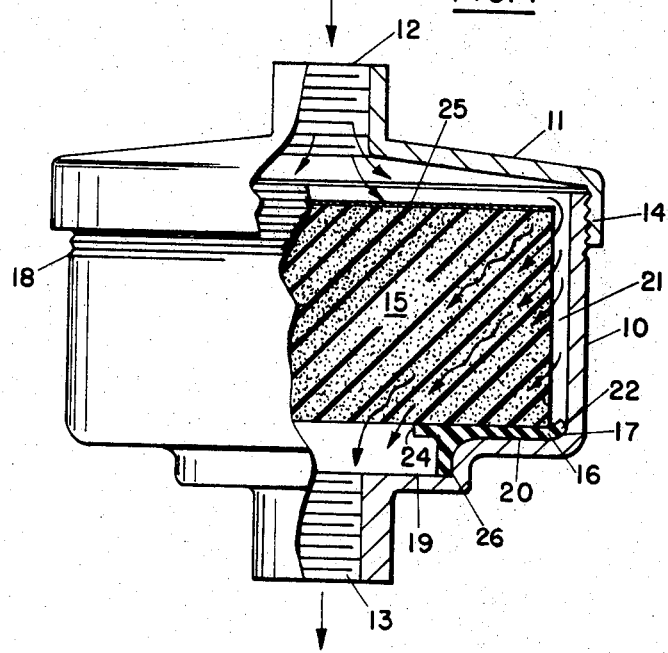
FIG. 2 is a partial cross sectional view taken on line 2—2 of FIG. 1.

Now with more particular reference to the drawing, the filter shown in FIGS. 1 and 2 has a hollow cup like body 10 with a cover 11. The cover has an inlet 12 and the body has an outlet 13. Both may be suitably threaded as shown to receive a suitable pipe element or other convenient attaching means.

The upper end of the body is threaded and the cover 11 has a downwardly extending flange 14 which is threaded as shown to receive the inside of a flange 14.

The bottom of the body has a recess 19 around the outlet 13 which receives the flange 26 of the base member 16.

The filter element 15 is a block of material which is generally in a shape conforming to the inside of the body but slightly smaller so that a flow passage or space 1 is defined between the outside of the filter element block 15 and the inside of the body 10. The base member 16 is sufficiently large so that its outer edge 2 extends beyond the outer periphery of the block of filter material 15 and forms a sealing engagement with the inside of the body. It actually extends slightly up and overlies the inside of the wall so that fluid pressure in the space 21 will cause the base to form a seal with the base of the body.

The flange 26 rests in the recess 19 and forms sealing engagement therein.

The base has an opening 24 which overlies the outlet 13. The top of the filter element 15 has the impervious material 25 thereon which may be in the form of paint or other suitable material which will form an impervious coating over the top of the filter element.

The filter element itself may be made of any of the following examples which are submitted as examples only.

*Example I*
Base member—polyethylene
Filter element—polyurethane ester foam

*Example II*
Base member—polypropylene
Filter element—polyurethane ester

*Example III*
Base—styrene
Filter element—polyurethane foam

*Example IV*
Base element—polyvinyl chloride
Filter element—polyurethane ester

*Example V*
Base—rubber
Filter element—polyurethane ester

Fluid entering the inlet 12 will flow over the impervious top 25 through the space 21 around the outside of the filter element through the filter element 15 to outlet 13.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A filter comprising
   a generally cylindrical open cup like member with a removable top thereon,
   said cup like member having an outlet opening in the bottom and an inlet opening in the top thereof,
   a base made of a disk like member having outer edges sealingly engaging the outer periphery of the bottom of said cup like member,
   a filter element made of an organic foam material bonded to said base and spaced inwardly from the inner wall of said cup like member providing a space therebetween whereby fluid may enter said inlet and flow through said filter element to said outlet the bottom of said member having a recess around said outlet and said base having a flange having an outer surface defining an intaglio of said bottom and said flange extending into said recess.
2. The filter recited in claim 1 wherein
   said filter element has a fluid impervious top surface thereon.
3. The filter recited in claim 2 wherein
   said filter element is made from a material having the properties of polyurethane foam.

References Cited

UNITED STATES PATENTS

| 645,238 | 3/1900 | Simpson | 210—448 |
|---|---|---|---|
| 2,739,916 | 3/1956 | Parker | 210—493 |
| 2,962,121 | 11/1960 | Wilber | 210—493 X |
| 3,108,866 | 10/1963 | Saunders. | |
| 3,186,552 | 6/1965 | Cutler | 210—496 X |
| 3,238,707 | 6/1966 | Witkowski | 55—510 |

FOREIGN PATENTS

| 1,143,840 | 4/1957 | France. |
|---|---|---|
| 1,292,357 | 4/1962 | France. |
| 858,127 | 1/1961 | Great Britain. |

REUBEN FRIEDMAN, *Primary Examiner.*

F. MEDLEY, *Assistant Examiner.*